United States Patent
Yeh et al.

(10) Patent No.: US 10,452,101 B2
(45) Date of Patent: Oct. 22, 2019

(54) ALIGNMENT STRUCTURE

(71) Applicants: Yao-Tsung Yeh, Taipei (TW); Jyh-Chyang Tzou, Taipei (TW); Hsin Yeh, Taipei (TW); Ming-Shun Lu, Taipei (TW); Wei-Hao Lan, Taipei (TW)

(72) Inventors: Yao-Tsung Yeh, Taipei (TW); Jyh-Chyang Tzou, Taipei (TW); Hsin Yeh, Taipei (TW); Ming-Shun Lu, Taipei (TW); Wei-Hao Lan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 180 days.

(21) Appl. No.: 14/987,763

(22) Filed: Jan. 5, 2016

(65) Prior Publication Data
US 2016/0195117 A1 Jul. 7, 2016

Related U.S. Application Data

(60) Provisional application No. 62/099,584, filed on Jan. 5, 2015.

(51) Int. Cl.
*F16B 1/00* (2006.01)
*G06F 1/16* (2006.01)
*F16M 11/04* (2006.01)

(52) U.S. Cl.
CPC ......... *G06F 1/1632* (2013.01); *F16M 11/041* (2013.01); *F16B 2001/0035* (2013.01)

(58) Field of Classification Search
CPC .................. F16B 2001/0035; Y10T 24/32
USPC ....... 63/900, 40, 41, 3, 3.1, 29.2, 15.5, 1.16, 63/1.17; 2/265; 24/378.1, 574.1
See application file for complete search history.

(56) References Cited

U.S. PATENT DOCUMENTS

| | | | | |
|---|---|---|---|---|
| 5,048,704 A | * | 9/1991 | Takahashi | A63H 17/264 213/75 D |
| 8,458,863 B2 | * | 6/2013 | Hunts | H01F 7/0242 24/303 |
| 2006/0139134 A1 | * | 6/2006 | Hunts | H01F 7/0242 335/205 |

FOREIGN PATENT DOCUMENTS

| | | |
|---|---|---|
| CN | 103093920 | 5/2013 |
| TW | M400262 | 3/2011 |
| TW | 201446113 | 12/2014 |

OTHER PUBLICATIONS

"Office Action of Taiwan Counterpart Application", dated Sep. 26, 2016, p. 1-p. 7, in which the listed references were cited.

* cited by examiner

Primary Examiner — Jack W Lavinder
(74) Attorney, Agent, or Firm — JCIPRNET (57) ABSTRACT

An alignment structure including a first casing, a first magnetic component, a second casing and a second magnetic component is provided. The first magnetic component is disposed at the first casing and has a first surface, and the first surface is a non-planar surface. The second magnetic component is disposed at the second casing and has a second surface, and the second surface is a non-planar surface. When the second casing leans against the first casing, the first surface and the second surface are facing each other, and a magnetic attraction between the first magnetic component and the second magnetic component guides the second magnetic component to be aligned to the first magnetic component, and stops the second casing from being separated from the first casing.

19 Claims, 6 Drawing Sheets

FIG. 12

ALIGNMENT STRUCTURE

CROSS-REFERENCE TO RELATED APPLICATION

This application claims the priority benefits of U.S. provisional application Ser. No. 62/099,584, filed on Jan. 5, 2015. The entirety of the above-mentioned patent application is hereby incorporated by reference herein and made a part of this specification.

TECHNICAL FIELD

The invention is related to an alignment structure, more particularly, to an alignment structure having a magnetic component.

DESCRIPTION OF RELATED ART

With rapid developments in technology, portable electronic devices, such as tablet personal computers (tablet PCs), smart phones, and the like have been widely used due to its advantages that allow users to carry around and operate easily. As the portable electronic device generally does not have a base for providing support and typically does not have a physical keyboard for a user to operate, the portable electronic device is mostly coordinated with a docking station in conventional designs. The docking station has abilities for accommodating and charging the portable electronic device, and further has a keyboard module for user input.

In some docking stations, a hook is being used to fix the portable electronic device; however, the hook can cause the device to have a poor appearance and is less convenient in alignment. In addition, some docking stations and portable electronic devices are respectively disposed with corresponding magnets so as to be fixed with magnetic attractions therebetween; however, magnetic attractive surfaces of the magnets are typically planar surfaces, such that magnetic attractions between various parts of two corresponding magnetic attractive surfaces are equal, and thus magnetic components are liable to produce lateral shifts and cause the docking station and the portable electronic device to be aligned inaccurately.

SUMMARY OF THE INVENTION

The invention provides an alignment structure with favorable alignment accuracy.

The alignment structure of the invention includes a first casing, a first magnetic component, a second casing and a second magnetic component. The first magnetic component is disposed at the first casing and has a first surface, and the first surface is a non-planar surface. The second magnetic component is disposed at the second casing and has a second surface, and the second surface is a non-planar surface. When the second casing leans against the first casing, the first surface and the second surface are facing each other, and a magnetic attraction between the first magnetic component and the second magnetic component guides the second magnetic component to be aligned to the first magnetic component, and stops the second casing from being separated from the first casing.

In one embodiment of the invention, the first surface has a first end, the second surface has a second end, and when the second casing leans against the first casing, a distance between the first end and the second end is a minimum distance between the first surface and the second surface.

In one embodiment of the invention, the first end and second end are both line-shaped.

In one embodiment of the invention, the first surface has a first end, the second surface has a second end, and when the second casing leans against the first casing, a magnetic attraction between the first end and the second end is a maximum magnetic attraction between the first surface and the second surface.

In one embodiment of the invention, the first end and the second end are both line-shaped.

In one embodiment of the invention, the first surface and the second surface are both convex surfaces.

In one embodiment of the invention, the first surface is an arc surface or a non-arc surface, and the second surface is an arc surface or a non-arc surface.

In one embodiment of the invention, at least one of the first magnetic component and the second magnetic component is a magnet.

In one embodiment of the invention, the first magnetic component is rotatably disposed at the first casing, and the second magnetic component is rotatably disposed at the second casing.

In one embodiment of the invention, the first casing has a first protruding structure, the second casing has a second protruding structure, a partial surface of the first magnetic component is in contact with the first protruding structure and adapted to rotate in relative to the first protruding structure, and a partial surface of the second magnetic component is in contact with the second protruding structure and adapted to rotate in relative to the second protruding structure.

In one embodiment of the invention, the first casing has a first column, the second casing has a second column, the first magnetic component has a first pivot hole, the second magnetic component has a second pivot hole, the first column is inserted into the first pivot hole, and the second column is inserted into the second pivot hole.

In view of the above, in the alignment structure of the invention, the first surface of the first magnetic component and the second surface of the second magnetic component are both non-planar surfaces, and thus magnetic attractions at various parts between the first surface and second surface, which are corresponding to each other, are not equal, and the maximum magnetic attraction between the first magnetic component and the second magnetic component is generated between the first end of the first surface and the second end of the second surface. Thus, the magnetic attraction between the first end and the second end drives the second end to move towards the first end, so as to guide the second casing and the second magnetic component thereon to be accurately aligned to the first casing and the first magnetic component thereon.

In order to make the aforementioned and other features and advantages of the invention comprehensible, several exemplary embodiments accompanied with figures are described in detail below.

DESCRIPTION OF THE EMBODIMENTS

Figure 1:
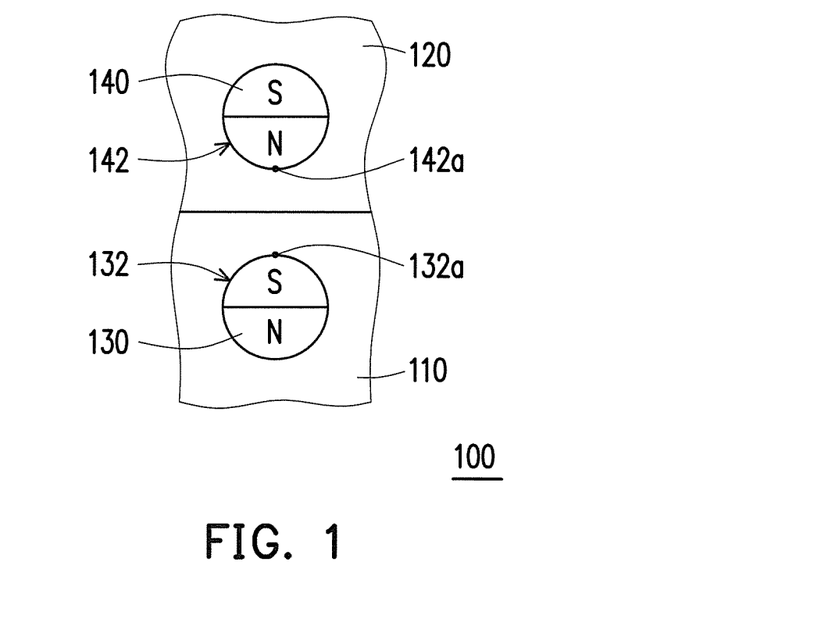
FIG. 1 is a schematic diagram illustrating an alignment structure according to an embodiment of the invention.
Figure 2:
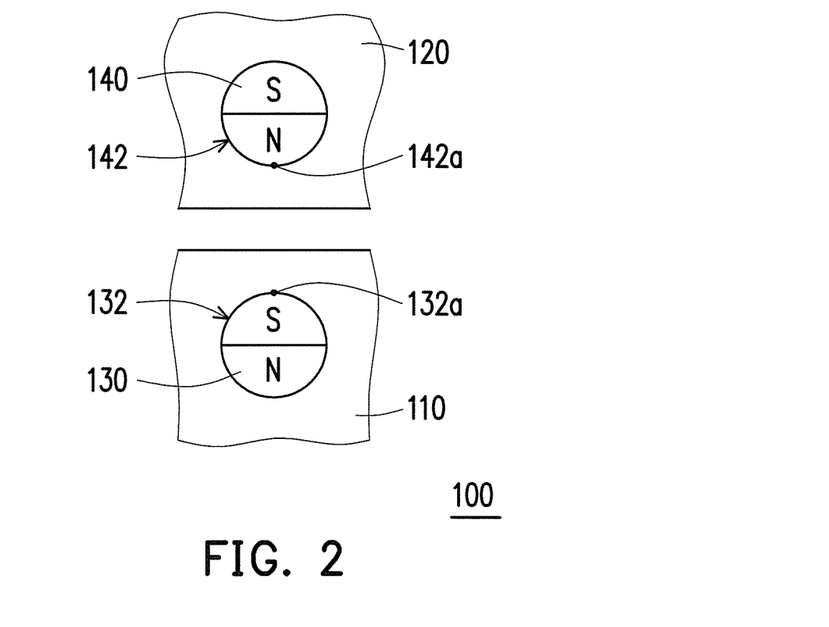
FIG. 2 illustrates a second casing of FIG. 1 being separated from a first casing.

FIG. 1 is a schematic diagram illustrating an alignment structure according to an embodiment of the invention. FIG. 2 illustrates a second casing of FIG. 1 being separated from a first casing. Referring to FIG. 1 and FIG. 2, an alignment structure 100 of the present embodiment includes a first casing 110, a second casing 120, at least one first magnetic component 130 and at least one second magnetic component 140. The first magnetic component 130 is disposed at the first casing 110 and has a first surface 132, and the first surface 132 is a non-planar surface and has a first end 132a. The second magnetic component 14 is disposed at the second casing 120 and has a second surface 142, and the second surface 142 is a non-planar surface and has a second end 142a. The numbers of the first magnetic component 130 and the second magnetic component 140 may respectively be a plurality, and the invention is not limited thereto.

In the present embodiment, the second casing 120 and the first casing 110 are, for example, respectively being a case of a portable electronic device (e.g., a tablet PC or a Smart phone) and a case of a corresponding docking station. In other embodiments, the second casing 120 and the first casing 110 may respectively be other combinable and detachable objects, and the invention is not limited thereto.

In the present embodiment, the first magnetic component 130 and the second magnetic component 140 are, for example, both being magnets. The first magnetic component 130 has a S-pole and an N-pole opposite to each other, and the second magnetic component 140 has a S-pole and an N-pole opposite to each other. The first surface 132 is, for example, a convex-arc surface on the S-pole of the first magnetic component 130, and the second surface 142 is, for example, a convex-arc surface on the N-pole of the second magnetic component 140. However, the invention is not limited thereto; in other embodiments, only one of the first magnetic component 130 and second magnetic component 140 can be the magnet, while the other one is a magnetizable metal component. In addition, in other embodiments, the first surface 132 and the second surface 142 may be convex surfaces of the non-arc surfaces, and the invention is not limited thereto.

When the second casing 120 moves from a state shown in FIG. 2 towards the first casing 110 to lean against the first casing 110 in a manner as shown in FIG. 1, the first surface 132 of the first magnetic component 130 and the second surface 142 of the second magnetic component 140 are facing each other, and a magnetic attraction between the first magnetic component 130 and the second magnetic component 140 guides the second magnetic component 140 to be aligned to the first magnetic component 130, and stops the second casing 120 from being separated from the first casing 110.

In detail, by designing the first surface 132 of the first magnetic component 130 and the second surface 142 of the second magnetic component 140 to be the non-planar surfaces as described in the above, spacings and magnetic attractions between various parts of the first surface 132 and the second surface 142 under the state shown in FIG. 1 are not equal, wherein a distance between the first end 132a and the second end 142a is a minimum distance between the first surface 132 and the second surface 142, and a magnetic attraction between the first end 132a and the second end 142a is a maximum magnetic attraction between the first surface 132 and the second surface 142. Thus, if the second casing 120 and the second magnetic component 140 thereon are not accurately aligned to the first casing 110 and the first magnetic component 130 thereon in a horizontal direction (or vertically aligned), then the magnetic attraction between the first end 132a and the second end 142a will drives the second end 142a to move towards the first end 132a, so as to achieve an effect of accurate alignment.

Figure 3:
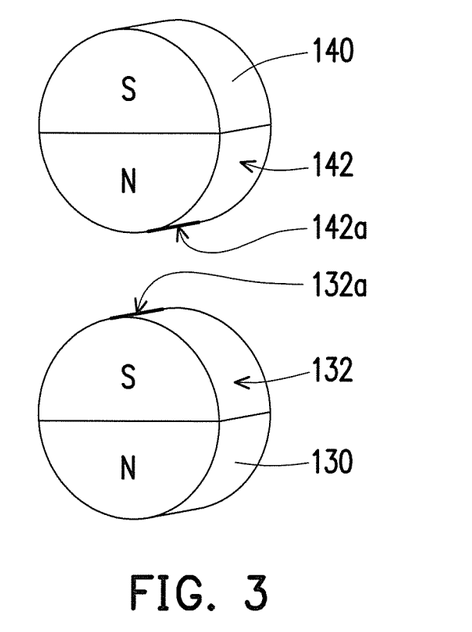
FIG. 3 is a perspective diagram illustrating a first magnetic component and a second magnetic component of FIG. 1.

FIG. 3 is a perspective diagram illustrating the first magnetic component and the second magnetic component of FIG. 1. To make the drawing clearer, the first casing 110 and the second casing 120 are not illustrated in FIG. 3. Referring to FIG. 3, the first magnetic component 130 and the second magnetic component 140 of the present embodiment are, for example, both being cylinders, the first end 132a of the first surface 132 and the second end 142a of the second surface 142 are both line-shaped, and an extending direction of the first end 132 is parallel to an extending direction of the second end 142a. However, the invention is not limited thereto, and further examples accompanied with figures are provided below.

Figure 4:
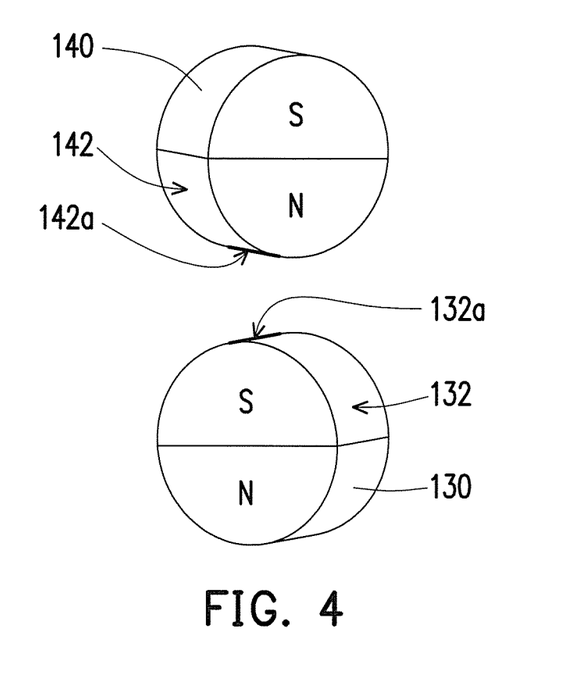
FIG. 4 is a perspective diagram illustrating a first magnetic component and a second magnetic component according to another embodiment of the invention.
Figure 5:
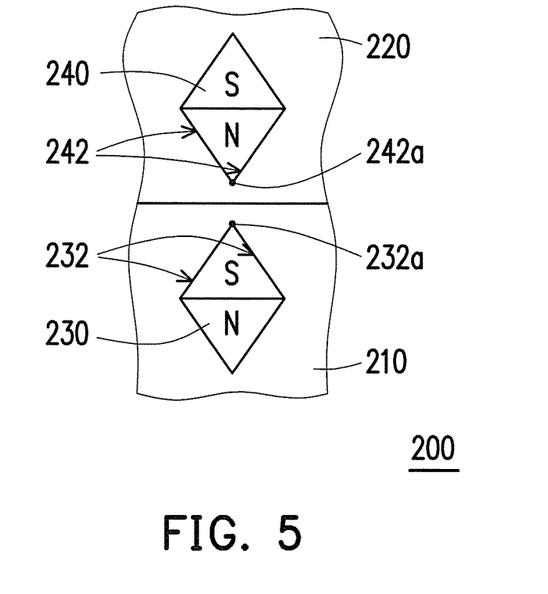
FIG. 5 is a schematic diagram illustrating an alignment structure according to another embodiment of the invention.

FIG. 4 is a perspective diagram illustrating a first magnetic component and a second magnetic component according to another embodiment of the invention. A difference between the embodiment shown in FIG. 4 and the embodiment shown in FIG. 3 lies in that, the extending direction of the first end 132 is not parallel (illustrates as perpendicular) to the extending direction of the second end 142a. FIG. 5 is a schematic diagram illustrating an alignment structure according to another embodiment of the invention. In an alignment structure 200 of FIG. 5, configurations and modes of action of a first casing 210, a second casing 220, a first magnetic component 230, a first end 232a, a second magnetic component 240, and a second end 242a are similar to the configurations and modes of action of the first casing 110, the second casing 120, the first magnetic component 130, the first end 132a, the second magnetic component 140, and the second end 142a of FIG. 1, and thus will not be described again. A difference between the alignment structure 200 and the alignment structure 100 lies in that, the first magnetic component 230 and the second magnetic component 240 are rhombic structures, thereby enabling the first surface 232 and the second surface 242 to be non-arc surfaces. In other embodiments, the first magnetic component and the second magnetic component may be other shapes having non-planar magnetic poles, and the invention is not limited thereto.

Figure 6:
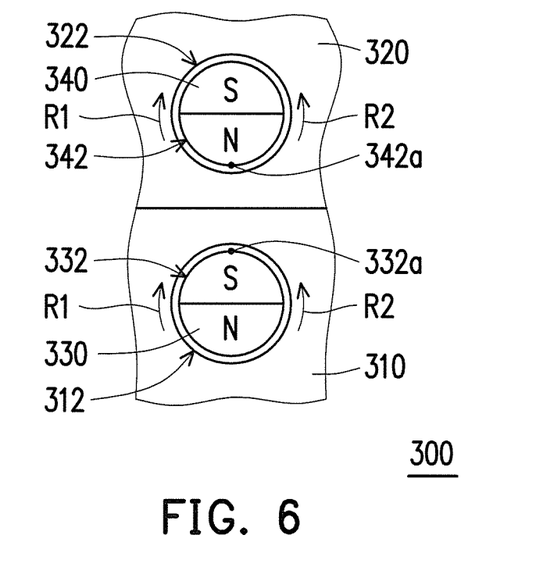
FIG. 6 is a schematic diagram illustrating an alignment structure according to another embodiment of the invention.

FIG. 6 is a schematic diagram illustrating an alignment structure according to another embodiment of the invention.

In an alignment structure 300 of FIG. 6, configurations and modes of actions of a first casing 310, a second casing 320, a first magnetic component 330, a first surface 332, a first end 332a, a second magnetic component 340, a second surface 342, and a second end 342a are similar to the configurations and modes of action of the first casing 110, the second casing 120, the first magnetic component 130, the first surface 132, the first end 132a, the second magnetic component 140, the second surface 142, and the second end 142a of FIG. 1, and thus will not be described again. A difference between the alignment structure 300 and the alignment structure 100 lies in that, the first magnetic component 330 is rotatably disposed in an accommodating groove 312 of the first casing 310, and the second magnetic component 340 is rotatably disposed in an accommodating groove 322 of the second casing 320. Hence, the first magnetic component 330 is not required to be fixed at the first casing 310 and the second magnetic component 340 is not required to be fixed at the second casing 320, so as to prevent the first end 332a of the first magnetic component 330 and the second end 342a of the second magnetic component 340 from not being accurately aligned due to assembling error. When the first magnetic component 330 and the second magnetic component 340 are close to each other as shown in FIG. 6, the first magnetic component 330 and the second magnetic component 340 automatically rotate along a rotational direction R1 or a rotational direction R2 via the magnetic attraction between the first end 332a and the second end 342a, so as to enable the first end 332a and the second end 342a to be accurately aligned.

Figure 7:
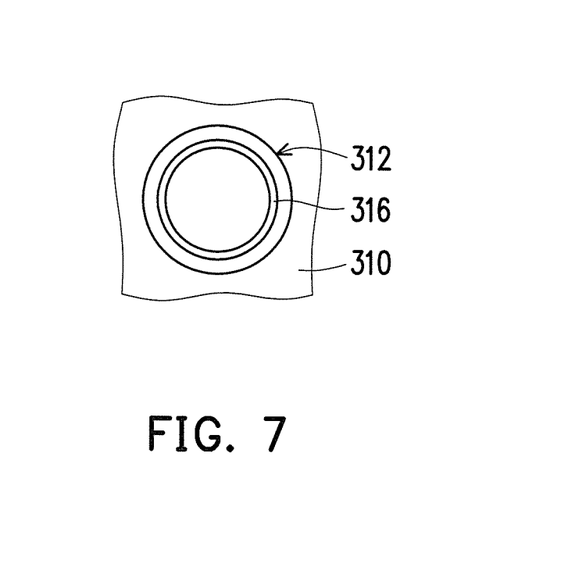
FIG. 7 illustrates a first casing of FIG. 6.
Figure 8:
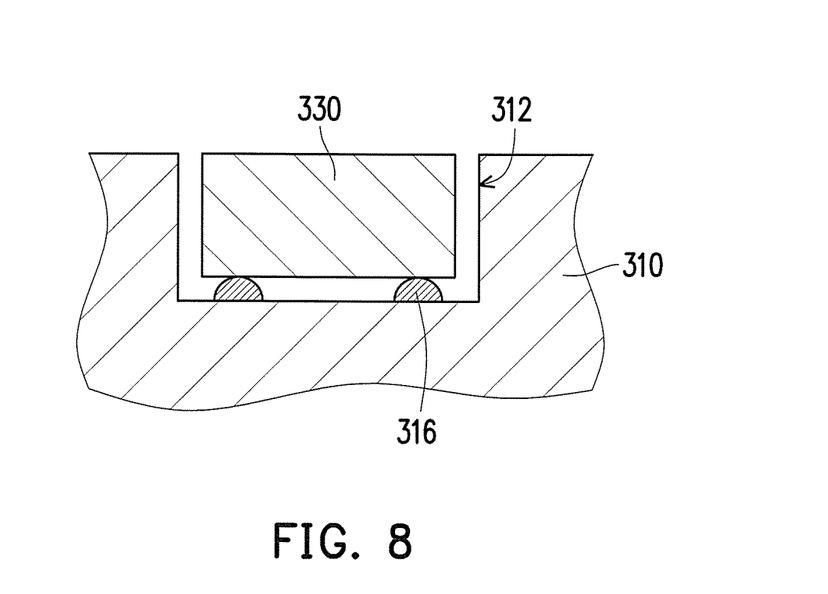
FIG. 8 is a cross-sectional diagram illustrating the first casing and a first magnetic component of FIG. 6.
Figure 9:
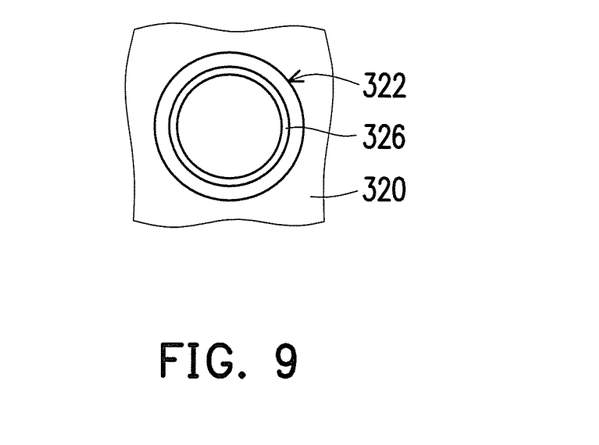
FIG. 9 illustrates a second casing of FIG. 6.
Figure 10:
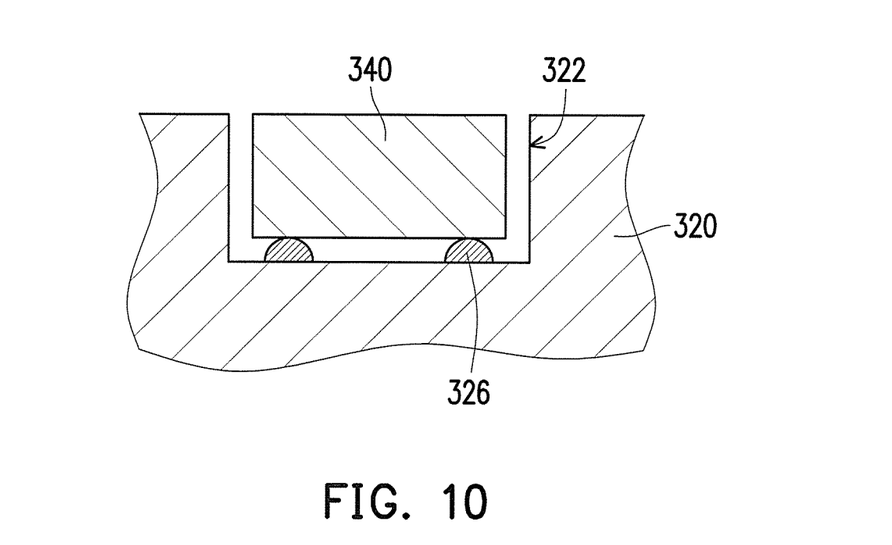
FIG. 10 is a cross-sectional diagram illustrating the second casing and a second magnetic component of FIG. 6.

FIG. 7 illustrates the first casing of FIG. 6. FIG. 8 is a cross-sectional diagram illustrating the first casing and the first magnetic component of FIG. 6. FIG. 9 illustrates the second casing of FIG. 6. FIG. 10 is a cross-sectional diagram illustrating the second casing and the second magnetic component of FIG. 6. Referring to FIG. 7 through FIG. 10, in the present embodiment, the first casing 310 has a first protruding structure 316, the second casing 320 has a second protruding structure 326, a partial surface of the first magnetic component 330 is in contact with the first protruding structure 316 and adapted to rotate in relative to the first protruding structure 316, and a partial surface of the second magnetic component 340 is in contact with the second protruding structure 326 and adapted to rotate in relative to the second protruding structure 326. As such, a contact area of the first magnetic component 330 and the first casing 310 and a contact area of the second magnetic component 340 and the second casing 320 can be reduced, thereby preventing a frictional force between the first magnetic component 330 and the first casing 310 and a frictional force between the second magnetic component 340 and the second casing 320 from being too large and hindering the rotations of the first magnetic component 330 and the second magnetic component 340.

Figure 11:
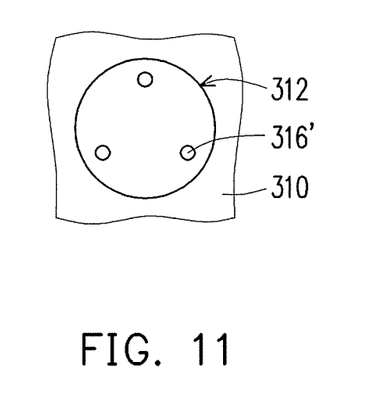
FIG. 11 illustrates a first casing according to another embodiment of the invention.

In the embodiment of FIG. 7, the first protruding structure 316 is ring-shaped, but the invention is not limited thereto, and further examples accompanied with figures are provided below. FIG. 11 illustrates a first casing according to another embodiment of the invention. A difference between the embodiment of FIG. 11 and the embodiment of FIG. 7 lies in that, a first protruding structure 316' is not ring-shaped but constituted of a plurality of bumps. The second protruding structure 326 shown in FIG. 9 may also be constituted of a plurality of bumps.

Figure 12:
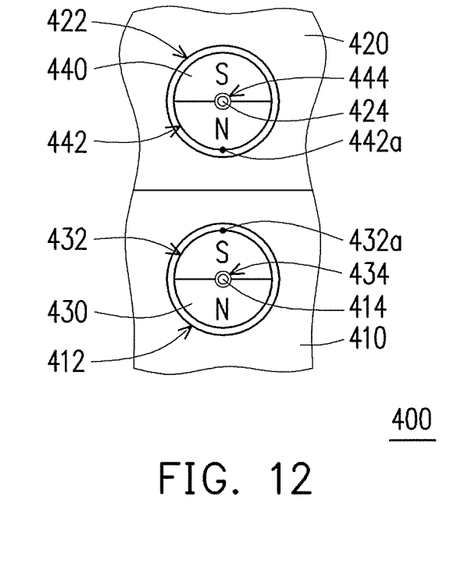
FIG. 12 is a schematic diagram illustrating an alignment structure according to another embodiment of the invention.

FIG. 12 is a schematic diagram illustrating an alignment structure according to another embodiment of the invention. In an alignment structure 400 of FIG. 12, configurations and modes of action of a first casing 410, a second casing 420, a first magnetic component 430, a first surface 432, a first end 432a, a second magnetic component 440, a second surface 442, and a second end 442a are similar to the configurations and modes of action of the first casing 310, the second casing 320, the first magnetic component 330, the first surface 332, the first end 332a, the second magnetic component 340, the second surface 342, and the second end 342a of FIG. 6, and thus will not be described again. Differences between the alignment structure 400 and the alignment structure 300 lie in that, an accommodating groove 412 of the first casing 41 has a first column 414 therein, the first magnetic component 430 has a first pivot hole 434, and the first column 414 is inserted into the first pivot hole 434. Similarly, an accommodating groove 422 of the second casing 420 has a second column 424 therein, the second magnetic component 440 has a second pivot hole 444, and the second column 424 is inserted into the second pivot hole 444.

In summary, in the alignment structure of the invention, the first surface of the first magnetic component and the second surface of the second magnetic component are both non-planar surfaces, and thus the magnetic attractions at various parts between the first surface and second surface, which are corresponding to each other, are not equal, and the maximum magnetic attraction between the first magnetic component and the second magnetic component is generated between the first end of the first surface and the second end of the second surface. Thus, the magnetic attraction between the first end and the second end drives the second end to move towards the first end, so as to guide the second casing and the second magnetic component thereon to be accurately aligned to the first casing and the first magnetic component thereon.

Although the present invention has been explained in relation to the above preferred embodiments, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An alignment structure, comprising:
   a first casing;
   a first magnetic component, disposed in the first casing and having a first surface, wherein the first surface is a non-planar surface;
   a second casing; and
   a second magnetic component, disposed in the second casing and having a second surface, wherein the second surface is a non-planar surface,
   wherein when the second casing leans against the first casing, the first surface and the second surface are facing each other, and a magnetic attraction between the first magnetic component and the second magnetic component guides the second magnetic component to be aligned to the first magnetic component, and stops the second casing from being separated from the first casing,
   wherein the first casing has a first protruding structure, the second casing has a second protruding structure, a part of a surface of the first magnetic component is in contact with the first protruding structure and adapted to rotate in relative to the first protruding structure, and a part of a surface of the second magnetic component is in contact with the second protruding structure and adapted to rotate in relative to the second protruding structure, wherein the first protruding structure and the second protruding structure are ring-shaped.

2. The alignment structure as recited in claim 1, wherein the first surface has a first end, the second surface has a second end, and when the second casing leans against the first casing, a distance between the first end and the second end is a minimum distance between the first surface and the second surface.

3. The alignment structure as recited in claim 2, wherein the first end is a tangent line of an apex of the first surface, and the second end is a tangent line of an apex of the second surface.

4. The alignment structure as recited in claim 1, wherein the first surface has a first end, the second surface has a second end, and when the second casing leans against the first casing, a magnetic attraction between the first end and the second end is a maximum magnetic attraction between the first surface and the second surface.

5. The alignment structure as recited in claim 4, wherein the first end is a tangent line of an apex of the first surface, and the second end is a tangent line of an apex of the second surface.

6. The alignment structure as recited in claim 1, wherein the first surface and the second surface are both convex surfaces.

7. The alignment structure as recited in claim 1, wherein the first surface is an arc surface or a non-arc surface, and the second surface is an arc surface or a non-arc surface.

8. The alignment structure as recited in claim 1, wherein at least one of the first magnetic component and the second magnetic component is a magnet.

9. The alignment structure as recited in claim 1, wherein the first magnetic component is rotatably disposed at the first casing, and the second magnetic component is rotatably disposed at the second casing.

10. The alignment structure as recited in claim 9, wherein the first casing has a first column, the second casing has a second column, the first magnetic component has a first pivot hole, the second magnetic component has a second pivot hole, the first column is inserted into the first pivot hole, and the second column is inserted into the second pivot hole.

11. An alignment structure, comprising:
a first casing;
a first magnetic component, disposed in a first accommodating groove of the first casing and having a first surface, wherein the first surface is a non-planar surface;
a second casing; and
a second magnetic component, disposed in a second accommodating groove of the second casing and having a second surface, wherein the second surface is a non-planar surface,
wherein when the second casing leans against the first casing, the first surface and the second surface are facing each other, and a magnetic attraction between the first magnetic component and the second magnetic component guides the second magnetic component to be aligned to the first magnetic component, and stops the second casing from being separated from the first casing,
wherein the first casing has a first protruding structure, the second casing has a second protruding structure, a part of a planar surface of the first magnetic component is in contact with the first protruding structure and adapted to rotate in relative to the first protruding structure, and a part of a planar surface of the second magnetic component is in contact with the second protruding structure and adapted to rotate in relative to the second protruding structure, wherein the first protruding structure and the second protruding structure are either ring-shaped or constituted of a plurality of bumps,
wherein the first casing has a first column, the second casing has a second column, the first magnetic component has a first pivot hole, the second magnetic component has a second pivot hole, the first column is inserted into the first pivot hole, and the second column is inserted into the second pivot hole.

12. The alignment structure as recited in claim 11, wherein the first surface has a first end, the second surface has a second end, and when the second casing leans against the first casing, a distance between the first end and the second end is a minimum distance between the first surface and the second surface.

13. The alignment structure as recited in claim 12, wherein the first end is a tangent line of an apex of the first surface, and the second end is a tangent line of an apex of the second surface.

14. The alignment structure as recited in claim 11, wherein the first surface has a first end, the second surface has a second end, and when the second casing leans against the first casing, a magnetic attraction between the first end and the second end is a maximum magnetic attraction between the first surface and the second surface.

15. The alignment structure as recited in claim 14, wherein the first end is a tangent line of an apex of the first surface, and the second end is a tangent line of an apex of the second surface.

16. The alignment structure as recited in claim 11, wherein the first surface and the second surface are both convex surfaces.

17. The alignment structure as recited in claim 11, wherein the first surface is an arc surface or a non-arc surface, and the second surface is an arc surface or a non-arc surface.

18. The alignment structure as recited in claim 11, wherein at least one of the first magnetic component and the second magnetic component is a magnet.

19. The alignment structure as recited in claim 11, wherein the first magnetic component is rotatably disposed at the first casing, and the second magnetic component is rotatably disposed at the second casing.

* * * * *